Figure 1:
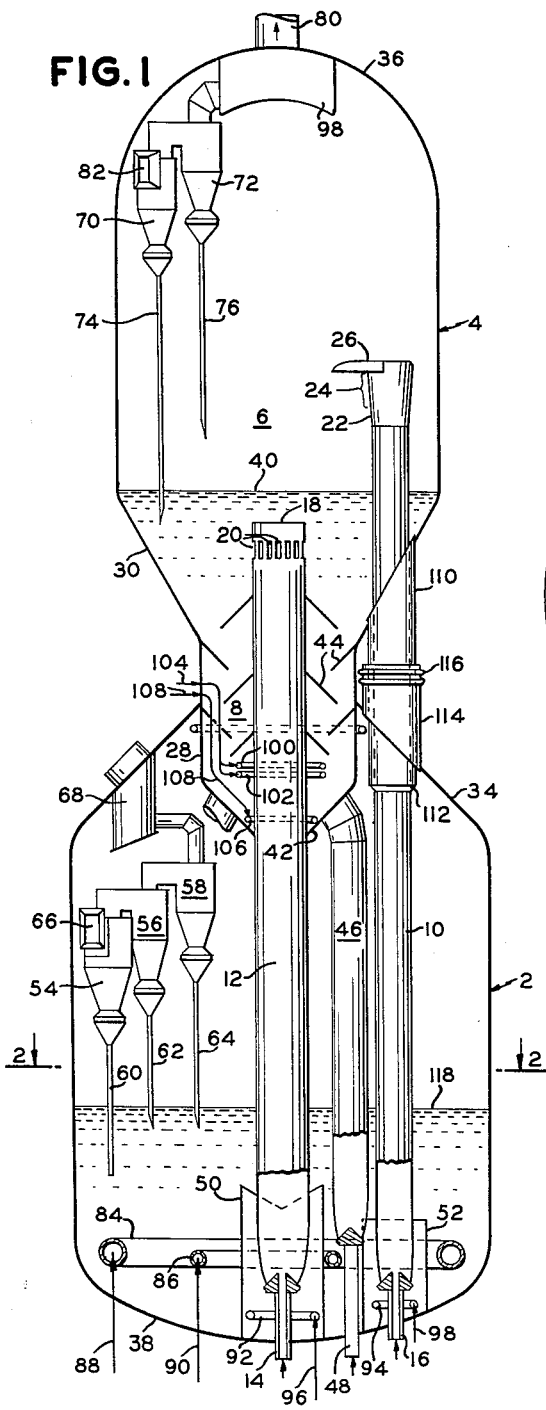

June 4, 1963

C. E. SLYNGSTAD ETAL 3,092,468

APPARATUS FOR HANDLING POWDERED MATERIAL

Filed May 9, 1961

INVENTORS
CHARLES E. SLYNGSTAD
GUNTHER P. ESCHENBRENNER
BY
ATTORNEY
AGENT

United States Patent Office 3,092,468
Patented June 4, 1963

3,092,468
APPARATUS FOR HANDLING POWDERED MATERIAL
Charles E. Slyngstad, Rutherford, N.J., and Gunther P. Eschenbrenner, Byram, Conn., assignors to The M. W. Kellogg Company, New York, N.Y., a corporation of Delaware
Filed May 9, 1961, Ser. No. 108,931
9 Claims. (Cl. 23—284)

This invention is directed to a method and an arrangement of apparatus for contacting fluidizable finely divided solid particle material with gasiform material. In a more specific aspect the invention is directed to a unitary vertically disposed arrangement of chambers for effecting conversion of hydrocarbons, stripping of finely divided solid particle material, regeneration of the particle material and the sequential flow of the finely divided solid particle material through the plurality of chambers in a desired manner.

It is an object of this invention to provide an improved vertically disposed unitary vessel for effecting segregated cracking of hydrocarbon feed materials under desired conversion conditions in the presence of finely divided catalytic material.

Another object of this invention is directed to providing a unitary arrangement of apparatus of desired strength for thermal stresses encountered in accomplishing the above.

Other objects and advantages of this invention will become more apparent from the following description.

In a broad aspect the improved apparatus and method of operation is provided for contacting finely divided solid material with gasiform material partially or completely vaporized such as in an atomized condition which comprises passing an upwardly flowing suspension of said solid material with gasiform material in a plurality of separate elongated substantially vertical reaction chambers or zones disposed in substantially parallel flow arrangement, separating the solid material from gasiform product material and returning the separated solid material to the bottom of the substantially vertical reaction chambers for reuse. More particularly, the improved apparatus and sequence of steps through which the solid contact material passes for conversion of hydrocarbon feed materials, stripping and regeneration of the solid material is directed to maximizing the versatility of the operation for obtaining the desired contact in a minimum of apparatus and solid contact material inventory. That is, in the arrangement of apparatus herein described, a relatively dense fluid bed of solid material of variable bed height is maintained about the upper end of a coaxially positioned elongated reactor chamber with the remaining elongated reactor chambers being vertically extended to discharge above the uppermost bed level maintained about the coaxial reactor chamber. More importantly, however, the apparatus to accomplish the above is a unitary substantially vertically disposed design structurally sufficient to withstand the loads and thermal stresses imposed thereon whereby elaborate supporting structure otherwise needed is eliminated.

In accordance with this invention, the improved apparatus provides a refiner with an arrangement of apparatus which is versatile and flexible in its operation and which will permit controlling the degree of conversion of a particular feed material or a variety of different feed materials simultaneously over a relatively wide range. This flexibility of operation is particularly important to a refiner when a single vessel design is employed for converting different hydrocarbon feed materials such as relatively high-boiling range hydrocarbon materials including gas oils, recycle oils, topped and reduced crudes.

Furthermore, these hydrocarbon feed materials require conversion conditions of different severity, contain constituents which are difficult to vaporize at the temperature and pressure conditions employed during conversion thereof and the higher boiling difficultly vaporizable feeds contribute to considerable operating difficulties when employing finely divided fluidizable solid contact material. That is, difficultly vaporizable or liquid-like constituents present in the hydrocarbon feeds tend to contribute to the formation of relatively large agglomerants of the finely divided contact material which will defluidize sometimes making it necessary to shut down the operation. In addition, considerable difficulty has been experienced in uniformly distributing relatively high-boiling hydrocarbon feed materials on the catalyst, controlling the severity of conversion, as well as controlling the time of contact of the feed with the solid contact material such that conversion to desired low-boiling products is obtained. Accordingly, the improved apparatus and method of operation described herein is directed among other things to providing a system of optimum flexibility and versatility of operation for converting different hydrocarbon feed materials either separately or simultaneously.

A suitable gasiform diluent material which is relatively inert may be employed with the hydrocarbon feed material to assist in atomization or break up of the hydrocarbon feed into relatively fine droplets and obtain more suitable distribution as well as intimate contact of the hydrocarbon feed with the finely divided solid contact material employed therein. The hydrocarbon feed with or without gaseous diluent material is mixed with finely divided solid contact material withdrawn from a regeneration zone at an elevated temperature to form a suspension which is then passed at a desired elevated temperature conversion condition upwardly through a suitable riser-reactor terminating in a reactor-separation zone. The reactor-separation zone is arranged to collect and concentrate in the lower portion thereof, the finely divided contact material discharged thereinto so that at least one of the riser-reactors will discharge into the relatively dense fluid bed in either the upper or lower portion thereof or all of the riser-reactors may be made to discharge above the upper dense fluid bed level of contact material depending upon the depth of the bed of contact material maintained in the lower portion of the reactor-separation zone. In the arrangement of apparatus herein defined, a fluid bed of finely divided contact material is maintained in the lower portion of the reaction zone as a conically shaped bed which is continuous and in open communication with a fluid bed of catalyst undergoing stripping in a stripping section therebelow. The relatively dense fluid bed of contact material in the lower portion of the reactor chamber is superimposed by a more dilute phase of relatively hot contact material discharged from the riser-reactors terminating above the upper bed level which settles out into the upper level of the dense fluid bed of contact material therebelow. That is, separation of hydrocarbon reactant product from finely divided contact material discharged from the riser-reactors is partially effected in the upper portion of the reaction zone by substantially reducing the vertical velocity component of the contact material so that contact material will settle out into the dense fluid bed therebelow. However, additional facilities are required to complete separation of the contact material from the reaction products and this is accomplished in a plurality of cyclone separator arrangements in the upper portion of the separation zone which returns the separated contact material to the dense fluid bed therebelow by suitable diplegs or standpipes connected thereto. In the fluid bed of contact material in the lower portion of the reaction zone hydrocarbon reactant material remaining adsorbed on the contact material undergoes further conversion for an extended period of contact time depending upon the height of the bed maintained therein as the contact materials move generally downwardly as a continuous bed of contact material into the upper end of a stripping zone positioned therebelow. Accordingly, the reaction zone performs many functions including separation of reactant product material from contact material, conversion of adsorbed hydrocarbon material, as well as effecting at least partial stripping of the contact material since the gaseous stripping material introduced to the lower portion of the stripping zone passes upwardly through the dense fluid bed of contact material and dispersed phase thereof in the reaction zone.

More specifically, in the method of operation employing the apparatus of this invention, a fresh feed hydrocarbon reactant material is contacted with catalytic material in one or more fresh feed riser-reactors for a relatively short time, in the range of from about 1 to about 6 seconds at an elevated temperature in the range of from about 950° F. to about 1050° F., and thereafter immediately separated to minimize overcracking with the more difficult material to be cracked provided with a greatly extended time of contact. The conversion conditions employed for cracking the more refractory material generally include a longer residence time controllable over a relatively wide range by passing the more difficultly cracked hydrocarbon feed through an enlarged coaxial riser-reactor which discharges into a fluid bed of catalyst in the lower portion of the reaction zone.

It has been found that a high regenerator temperature leads to a high coke burning rate and hence to a reduction in regenerator size. In addition, lower catalyst circulation rates may be employed with the higher regenerator temperature because each ton of catalyst carries more heat to the reactor. The lower circulation rates are particularly desirable since this tends to minimize any loss of unstripped hydrocarbons to the regenerator and it also leads to maintaining a longer average residence time of the catalyst in the reactor which in turn maximizes decomposition of heavy adsorbed hydrocarbons and recovery of products thereof, thereby minimizing coke yields. Accordingly, employing the higher regenerator temperatures of about 1150° F. to about 1250° F. and comparatively low catalyst to oil ratios of from about 5 to about 10 to 1 minimizes the amount of unstripped hydrocarbons carried into the regenerator. Furthermore, the improved method and apparatus of this invention permits passing the hot partially used catalyst from the plurality of risers into the fluid bed of catalyst maintained in the lower portion of the reaction zone which maximizes the opportunity for subsequent cracking often referred to as soaking cracking of the heavy hydrocarbons adsorbed on the catalyst surface. This soaking cracking and recovery of hydrocarbon product materials thereof is facilitated in addition to the above by positioning the stripper bed beneath and in open communication with the reactor fluid bed of catalyst, which arrangement minimizes back-mixing of catalyst between the reactor and the stripper. Furthermore, this arrangement takes advantage of the stripping steam introduced to the lower portion of the stripper by reducing both stripper and reactor oil partial pressure for removal of entrained hydrocarbons from the catalyst at an extended holding time for maximum recovery of hydrocarbon therefrom.

As indicated hereinbefore, applicants' invention is directed in one aspect to an improved unitary vessel design for effecting the herein discussed process which will structurally support the loads imposed thereon and thermal stresses encountered therein. In a unitary vessel of the type described herein there inherently exists substantial temperature differences and temperature gradients in various components of the apparatus which impose stresses upon the vessel components which are particularly aggravated by the high temperatures employed, as well as changing temperatures encountered therein. That is, during normal operation thereof and during auxiliary operations of starting up and shutting down the unavoidable temperature differences between the cracking sections or components and attendant stress variations imposed thereby will, unless properly dispersed, ultimately cause destruction due to fatigue at the points of high load stress concentration. However, even with these stress difficulties the unitary vertically disposed vessel arrangement described herein is economically attractive operationally and becomes particularly attractive structurally when the vessel design itself will support the loads imposed thereon without the need for additional supporting structure. It is to this end that the improved vessel design of this invention is directed. Accordingly, the improved unitary apparatus of this invention is arranged to convey the structure loads imposed thereon to the cylinder walls of the regenerator through an inverted conical head member which is rigidly attached at its upper end to the upper chamber at its cylindrical section of minimum diameter and intermediate of localized stress areas at the top and bottom of the cylindrical section of minimum diameter.

Having thus given a general description of the improved method and means of this invention, reference is now had by way of example to the drawings, which present diagrammatically in elevation a preferred arrangement of the apparatus of this invention.

Referring now to FIGURE 1, a vertically disposed unitary arrangement of apparatus is shown having a lower regeneration chamber 2, an upper chamber 4 of larger diameter in the upper portion than in the lower portion and constituting an upper reactor disengaging section 6 in open communication with a lower intermediate stripping section 8. A first riser-reactor 10 extends from the lower portion of the regeneration chamber 2 substantially vertically upwardly into the upper portion of the reactor section 6 and external to the stripping section 8. A second riser-reactor 12 extends from the lower portion of the regenerator chamber substantially vertically upwardly and coaxially through the stripping section before terminating in the lower portion of the reactor section. Suitable vertically movable hollow stem plug valves 14 nd 16 are aligned with the bottom open end of the riser-reactors for introducing reactant material thereto and the upper discharge end of each riser is capped by a suitable discharge means. That is, the discharge end of the riser may be capped with a solid deflector plate 18 and provided with a plurality of vertical openings or slots 20 around its upper periphery as shown with respect to the second riser 12 with the slots or openings having an area at least equal to about one and one half times the cross sectional area of the riser, or the riser may be expanded in cross-sectional area resembling a cone 22 at its discharge end as shown with respect to the first riser 10. An opening 24 is provided in one side of the cone for discharging material passing through the riser in a generally horizontal direction therefrom and away from the side of the reactor. The top of the cone 22 is provided with an impingement plate or deflector baffle 26 suitably sized to assist with the horizontal deflection of the material discharged from the riser. In the arrangement of apparatus shown and described herein, there may be one or more, for example, a plurality of first risers 10 as shown with respect to FIGURE 2, which terminate in the upper portion of the reactor and because of their proximity to the reactor wall, the riser discharge opening is in the side of the expanded portion of the riser and away from the reactor wall. On the other hand, the discharge means of the second riser 12 because of its coaxial position within the reactor is provided with a discharge means referred to as a "bird cage" having a plurality of slots around its upper periphery and capped by a solid deflector plate for effecting substantially uniform horizontal discharge of the material about the end thereof.

In the arrangement of apparatus herein described the stripping section 8 of the upper chamber is positioned between the reactor section and the regenerator chamber as an annular section in view of the second riser conduit 12 being coaxially positioned within the vessel. The stripping section formed by the cylindrical member 28 of smaller diameter of the upper chamber extends downwardly from the conical transition forming the bottom of the reactor section and is in open communication therewith. That is, the bottom edge of the cylindrical member 4 of largest diameter forming the reactor-separator section of the upper chamber is connected to the top edge of the cylindrical member 28 forming the stripping section by a frusto conical baffle member 30, with the slope of the conical baffle forming the transition therebetween being maintained as high as possible without more than about one half of the length of the baffle being intercepted by the area required for the riser 10 passing therethrough. Accordingly, the slope of the conical baffle 30 forming the transition or bottom of the reactor section will be controlled by the diameter of riser 10 passing therethrough for the reasons discussed above and should be maintained as close to the vertical as possible to minimize any tendency of particle material retained therein in a fluidized condition from defluidizing and forming dead areas adjacent the periphery of the cone or cylindrical wall of the reactor chamber.

The cylindrical regenerator chamber 2 positioned below and of larger diameter than the upper chamber containing the reactor and stripper sections is provided with an inverted frusto conical head member 34 extending upwardly from the cylindrical wall thereof and joined at its upper edge with the cylindrical wall 28 of the stripping section substantially above the bottom thereof but below the upper edge thereof so that the lower portion or a substantial portion of the stripping section extends downwardly into and is confined within the upper portion of the regenerator chamber. The slope of the conical baffle forming the top of the regenerator chamber is selected on the basis of that required to bear the loads imposed thereon by the structure above with a view in mind of minimizing the overall height of the unitary vessel. This slope, however, will vary depending upon the size of the vessel constructed and in the apparatus specifically described herein it was found that a slope of about 45° was satisfactory for supporting the loads encountered in the apparatus described herein. To complete the unitary vessel arrangement and minimize the overall height thereof the top of the upper chamber or reactor section is formed by a hemispherically shaped baffle member 36 and the bottom of the regenerator chamber is provided with a dish shaped baffle member 38.

The arrangement of apparatus herein described has many advantages associated therewith, one of which resides in providing a coaxially positioned riser 12 which may be substantially any constant desired diameter or of varied diameters throughout the length thereof. That is, the riser may be of uniform diameter throughout substantially its vertical height or it may be of larger diameter in the upper portion than in the lower portion. For example, the coaxial riser may be of the shape shown in the drawing having a bottom inlet diameter of about 48 inches which is increased to a maximum inside diameter of about 67 inches for the major portion of the length thereof. In another embodiment, it is contemplated having the riser shaped as shown in the drawing up to its juncture with the bottom of the stripping chamber and thereafter extending the riser upwardly at an expanded constant diameter. In any of these embodiments, it is preferred that the coaxial riser terminate within the conical bottom 30 of the reactor, preferably substantially above the bottom thereof so that the normal dense bed level 40 of the fluid bed of contact material may be maintained generally within the conical section of the chamber. However, as indicated hereinbefore when more severe reaction conditions are required, the bed level of the contact material may be raised to any desired height, more usually not above the discharge of the first riser terminating in the upper portion of the reactor chamber. It is also contemplated maintaining the bed level below the discharge of the coaxially positioned riser.

Figure 2:
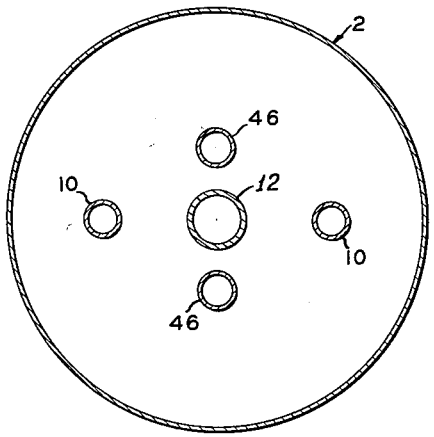

The stripping section which is an annular section extends downwardly from the conical transition of the reactor chamber into the regenerator chamber and is closed at its bottom end with a frusto conical baffle member 42 which is rigidly attached at its lower end to riser 12 as the means for supporting the coaxially positioned riser within the vessel. In the specific embodiment shown the annular stripping section is provided with a plurality of downwardly sloping alternately staggered disc shaped baffle members 44 with the uppermost and lowermost baffle member attached to the coaxial riser and sloping towards the external wall of the stripping section. It is contemplated, however, of providing the annular stripping section with a plurality of vertically disposed baffle members uniformly spaced in such a manner as to represent a cart wheel in cross-section and separate the annular section into a plurality of vertically elongated open end sections through which the finely divided solid material undergoing stripping must pass. Attached to and extending downwardly from the conical bottom 42 of the stripping section is provided one or more, preferably a plurality of open end standpipes 46 which terminate in the lower portion of the regenerator chamber. These standpipes may be spaced with respect to riser-reactors 10 as shown in FIGURE 2. The bottom open end of each standpipe is aligned with a vertically movable plug valve 48 for controlling the rate of finely divided solid particle material discharged from the standpipe into the regenerator chamber. The bottom open end of the riser conduits herein described are aligned with suitable vertically movable hollow stem plug valves 14 and 16 as shown through which gasiform reactant material is passed for flow upwardly through the respective risers. Suitable withdrawal wells defined by cylindrical baffle members 50 and 52 open at their upper ends extend upwardly from the bottom of the regenerator chamber around the lower portion of riser conduits 12 and 10 respectively to form an annular space therewith.

Positioned in the upper portion of the regenerator chamber are a plurality of sets of three stage cyclone separators sequentially connected, represented by 54, 56 and 58 having diplegs 60, 62 and 64 and provided with a gaseous material inlet 66 thereto. The plurality of sets of cyclone separators are connected to two semicircular annular plenum chambers positioned in the upper portion of the regenerator chamber as represented by chamber 68. There is also provided a plurality of sets of cyclone separators represented by 70 and 72 having diplegs 74 and 76 in the upper portion of the reactor chamber and connected to a common plenum chamber 78 from which gasiform material is withdrawn by conduit 80. Each set of cyclone separators is provided with an inlet 82 as shown in the drawing.

Positioned in the lower portion of the regenerator chamber are gasiform distributor manifolds 84 and 86 supplied by conduits 88 and 90 respectively for introducing regeneration gaseous material to the lower portion of a fluid bed of contact material maintained in the lower portion of the regeneration chamber. In addition, gasiform distributor manifolds 92 and 94 supplied by conduits 96 and 98 respectively are provided in the lower portion of cylindrical wells 50 and 52 for introducing fluffing gasiform material thereto. Distributor manifolds 100 and 102 supplied by dividing conduit 104 are positioned in the lower portion of the stripping chamber for introducing stripping gasiform material thereto with an additional distributor manifold 106 supplied by conduit 108 positioned adjacent the bottom of the stripping chamber for introducing fluffing gasiform material thereto. As pointed out hereinbefore there may be a plurality of first riser-reactors 10 provided within the vessel which extend substantially vertically upwardly therethrough and external to the stripping chamber. With such an arrangement these riser-reactors must pass through the conical members 34 and 30 forming the top of the regenerator chamber and the bottom of the reactor chamber and suitable means for sealing these points against pressure and material loss is particularly aggravated by the temperature differences existing in the two chambers when employed for the conversion of hydrocarbons and regeneration of the catalyst, as well as the need to provide a suitable arrangement for supporting the risers within the vessel and permit movement with respect thereto relative to the temperature differences encountered within the vessel. Accordingly, in the apparatus of this invention a first cylindrical sleeve 110 of larger diameter than said riser 10 is rigidly attached at its upper end to the conical bottom 30 of the reactor chamber and extends downwardly into the regenerator chamber wherein the bottom edge of the sleeve is rigidly attached to the riser at a point 112 within the regenerator chamber, thereby supporting the riser from the conical bottom 30 of the reactor chamber. A second cylindrical sleeve 114 of larger diameter than said first sleeve and provided with a bellows type expansion joint 116 between the ends thereof is rigidly attached at its bottom end to the conical baffle forming the top of the regenerator chamber and extends upwardly therefrom for rigid attachment at its upper end to said first sleeve 110 intermediate the conical heads 30 and 34. Provisions, not shown, are made for introducing gasiform material between said sleeves to maintain them freely movable and substantially free of any adversely effecting materials such as finely divided powdered contact material.

The arrangement of apparatus herein described is particularly useful for the conversion of hydrocarbon feed materials in the presence of fluidizable finely divided catalytic material wherein a relatively dense fluid bed of catalyst having an upper bed level 118 is regenerated with oxygen-containing gas, thereby heating the catalyst to an elevated temperature. A portion of the hot regenerated catalyst is withdrawn into the top of the well 52 surrounding riser 10 for passage downwardly therethrough and entrance into the bottom of the riser, the amount entering, controllable by the vertical movement of the hollow stem plug valve 16. The entering catalyst is mixed with fresh hydrocarbon feed introduced by valve 16 within the riser to form a hot catalyst-oil suspension which is passed upwardly through the riser and discharge above the dense fluid bed of catalytic material maintained in the lower portion of the reaction zone. The temperature of the suspension passing through riser 10 may be controlled over a relatively wide range of from about 950° F. to about 1050° F., which will be dependent upon the desired conditions of cracking severity and the catalyst to oil ratio maintained in the riser may be maintained within the range of from about 4 to about 15 to 1. When employing more than 1 riser similar to riser 10, the conditions of operation employed therein may be the same as or different from that employed in the other riser depending upon the boiling range of the feed being passed thereto. Simultaneously with the above, a portion of the hot regenerated catalyst is continuously withdrawn into well 50 surrounding the coaxially positioned riser 12 for downward flow therein and entrance into the bottom of the riser. The catalyst is then mixed with a second hydrocarbon feed material generally more difficult to crack such as a recycle oil introduced by valve 14 to form a second suspension which is passed upwardly through the riser. The second suspension is generally maintained at a lower temperature than that employed in the first riser and within the range of from about 800 to about 950° F., while employing a catalyst to oil ratio within the range of from about 2 to about 14 to 1. Accordingly, the density of the suspension employed in the second riser may be higher or lower than that employed in the fresh feed riser depending upon the severity of the conversion conditions desired therein. Furthermore, the suspension in the second riser passes upwardly therethrough generally at a lower velocity than that employed in the fresh feed riser thereby providing a greater time of contact between the hydrocarbon and catalyst. The suspension in the second riser is discharged into the lower portion of the reactor section and most usually beneath the upper bed level of a dense fluid bed of catalytic material maintained in the lower portion thereof. As pointed out hereinbefore, it is contemplated, however, of discharging the suspension from the second riser at substantially the bed interface or even above the upper bed level depending upon the size of riser employed and the severity of conversion conditions desired. Generally the bed of catalyst in the reactor chamber will be maintained at a temperature within the range of from about 850 to about 975° F., and this temperature will be dependent upon the temperature of the catalyst discharged from the plurality of risers hereinbefore discussed. During contact of the catalyst with the hydrocarbon reactant materials hydrocarbonaceous materials which are not readily vaporizable coat or become deposited upon the catalyst particles and to facilitate their removal and recovery therefrom the catalyst particles are subjected to a prolonged cracking period at a reduced hydrocarbon partial pressure within the dense fluid bed of catalyst. Thereafter the catalyst passes downwardly through the annular stripping section positioned therebelow as a continuous downwardly moving dense fluid bed of catalyst countercurrent to gasiform stripping material such as steam introduced to the lower portion thereof. Since the stripping chamber is positioned beneath the reactor chamber and in open communication therewith, the gaseous stripping material introduced to the lower portion of the stripping chamber passes upwardly therethrough and through the fluid bed of catalyst thereabove wherein conversion of hydrocarbons is taking place, thereby facilitating the removal of the difficulty vaporizable hydrocarbon material coating the catalyst particles. The stripped catalyst containing non-removable carbonaceous material is removed from the bottom of the stripper and passed by one or more standpipes 46 to the lower portion of a bed of catalyst undergoing regeneration in the regeneration chamber. Generally the catalyst undergoing stripping is maintained at a temperature substantially equal to, but may be higher or lower than the temperature of the fluid bed of catalyst in the reactor chamber. In the regeneration chamber carbonaceous material on the catalytic material is removed by burning in the presence of an oxygen-containing gas, thereby heating the catalyst to an elevated temperature suitable for recycle to the riser-reactors as hereinbefore described. Generally the regenerator may be operated at a temperature in the range of from about 1100° F. to about 1400° F., preferably from about 1150° F. to about 1250° F.

For the purpose of clarifying the arrangement of risers hereinbefore described, FIGURE 2 is presented to show diagrammatically in cross-sectional arrangement one embodiment employing the plurality of risers and standpipes as positioned within the regenerator. The numerals identifying the respective components of the vessel are identical to those referred to in FIGURE 1 and accordingly further discussion thereof is unnecessary.

For a further understanding of the apparatus herein described the following data is presented by way of example.

| | |
|---|---|
| Regenerator diameter, I.D._____ft__ | 49 |
| Regenerator catalyst inventory_____tons__ | 655 |
| Regenerator pressure top_____p.s.i.g__ | 18 |

| | |
|---|---|
| Regenerator temperature ° F | 1150 |
| Reactor diameter, I.D ft | 37 |
| Reactor catalyst inventory tons | 114.4 |
| Reactor pressure top p.s.i.g | 10 |
| Reactor bed temperature ° F | 965 |
| Stripper diameter, I.D ft | 20 |
| Stripper catalyst inventory tons | 133 |
| First riser diameter, I.D in | 42 |
| Second riser diameter, I.D in | 67 |
| Catalyst inventory (risers and sandpipes) tons | 30.9 |

Having thus provided a description of the method and apparatus of this invention and given a specific example thereof, it is to be understood that no undue restrictions are to be imposed by reasons thereof, except as defined by the claims.

We claim:

1. An apparatus comprising in combination a first cylindrical chamber of larger diameter in the upper portion than in the lower portion with the transition therebetween formed by a first frusto-conical baffle member sloped at an angle such that not more than about one half the length of the baffle slope is intercepted by a first elongated substantially vertical conduit extending therethrough, said first conduit supported by said first frustoconical baffle and terminating thereabove within said first chamber, a second elongated substantially vertical conduit extending upwardly into said first chamber to form an annular section therewith which terminates within said conical transition section, said second conduit supported by a baffle member forming the bottom of said annular section, a plurality of open end third conduits supported by and extending downwardly from the bottom of said annular chamber to a level within the lower portion of a second chamber hereinafter defined, said first and second conduits terminating in the lower portion of said second chamber, said first chamber and conduits attached thereto supported by a second chamber of larger diameter than the maximum diameter of said first chamber through an inverted frusto conical head member which is attached at its minimum diameter to the minimum cylindrical section of said first chamber substantially above the bottom thereof.

2. A unitary apparatus comprising in combination an upper cylindrical reaction chamber in open communication with a lower cylindrical stripping chamber of smaller diameter than said reaction chamber and connected thereto by a conical baffle member to form a conical section therewith, a lower cylindrical regenerator chamber of larger diameter than said stripper chamber supporting the reactor and stripper chamber thereabove through an inverted conical baffle head member to maintain the lower portion of the stripper chamber confined within the upper portion of the regenerator chamber, a first coaxially positioned riser conduit extending upwardly from the lower portion of the regenerator chamber and terminating within the lower portion of the reactor chamber, at least one standpipe extending downwardly from the bottom of the stripper chamber into the lower portion of the regenerator chamber, at least one second substantially vertical riser conduit extending from the lower portion of the regenerator chamber into the upper portion of the reactor chamber external to said stripper chamber, said second riser conduit passing through said conical baffles and supported by a first sleeve member which is rigidly attached at its upper end to said upper conical baffle and its lower end to said second riser within said regenerator chamber, a second sleeve member of larger diameter than said first sleeve rigidly attached at its lower end to said inverted conical baffle and at its upper end to said first sleeve member intermediate said conical baffles, means for passing gasiform material upwardly through said risers, means for removing gasiform material from the upper portion of said reactor and regenerator chambers and means for introducing gasiform material to the lower portion of said stripper and said regenerator chambers.

3. A unitary vessel comprising in combination a first cylindrical chamber of larger diameter in the upper portion than in the lower portion with the transition therebetween formed by a first frusto conical baffle member, a second cylindrical chamber of larger diameter than said first chamber positioned beneath and supporting the first chamber thereabove through an inverted frusto conical head member forming the top of the second chamber and rigidly attached to said first chamber at its smallest diameter in an intermediate portion thereof, a first conduit extending downwardly from within the transition section of said first chamber into the lower portion of said second chamber to form an annular section open at its upper end within the lower portion of said first chamber, at least one second conduit extending downwardly from the bottom of said annular section into said second chamber, a plurality of third substantially vertical conduits extending downwardly from within said first chamber and through said conical members into the lower portion of said second chamber, means for supporting and sealing said third conduits passing through said conical members, vertically movable hollow stem plug valves aligned with the bottom end of said first and third conduits, distributor means for introducing gasiform material to the lower portion of said annular section and said second chamber and means for removing gasiform material from the upper portion of each of said chambers.

4. The apparatus of claim 3 wherein said third conduit passes substantially vertically through each of said conical baffles and is supported from the uppermost conical baffle by a first cylindrical sleeve member rigidly attached at its upper end to the uppermost conical baffle and at its lower end to said third conduit within said second chamber and a second expandable cylindrical sleeve member of larger diameter than said first sleeve member is rigidly attached at its lower end to said inverted conical baffle and at its upper end to said first sleeve member below said upper conical baffle.

5. The apparatus of claim 3 wherein said first conduit is of larger diameter than said third conduit and supported within the vessel by a conical baffle member forming the bottom of said annular section.

6. The apparatus of claim 3 wherein the upper portion of said second chamber contains semi-circular annular plenum chambers having a plurality of cyclone separator means attached thereto for the recovery of and removal of gasiform material from the upper portion of said second chamber.

7. The apparatus of claim 3 wherein said third conduits are diametrically opposed to one another and said second and third conduits are spaced cross sectionally substantially equal distances from one another.

8. A unitary vessel arrangement comprising in combination a first chamber of larger diameter in the upper portion than in the lower portion formed by an upper cylindrical member connected to a lower cylindrical member by a frusto conical member, a second cylindrical chamber of larger diameter than said first chamber positioned beneath said first chamber, said first chamber supported by said second chamber through an inverted frusto conical member forming the top closure member of said second chamber and connected to said first chamber to maintain a portion of the cylindrical section of said first chamber beneath the upper end of said inverted frusto conical member, at least one first riser conduit extending from the lower portion of said second chamber upwardly through said conical members and terminating in the section of maximum diameter of said first chamber, a second conduit of larger diameter than said first conduit extending from the lower portion of said second chamber coaxially upwardly through said vessel and terminating in the section of said first chamber formed by the frusto conical member thereof, said second conduit forming an annular section in the lower cylindrical portion of said first chamber, vertically movable hollow stem plug valves aligned with the bottom open end of said first and second conduits, at least one open end third conduit extending from the bottom of said annular section into the lower portion of said second chamber, a vertically movable plug valve aligned with the bottom open end of said third conduit, means for introducing gasiform material to the lower portion of said first and second chambers and means for removing gasiform material from the upper portion of said first and second chambers.

9. A unitary vertically disposed vessel arrangement comprising in combination a first upper chamber and a second lower chamber, said upper chamber formed by cylindrical members to provide a cylindrical section of larger diameter in the upper portion of the first chamber than in the lower portion thereof with the transition therebetween formed by a conical baffle member connected to said cylindrical members, said second chamber formed by a cylindrical member of larger diameter than said upper chamber and rigidly attached to said upper chamber through an inverted conical member, the minimum diameter of said inverted conical member rigidly attached to the first chamber at its cylindrical member of minimum diameter intermediate the ends thereof, a first conduit extending from above the bottom of said second chamber upwardly into said first chamber to form an annular section in the lower minimum diameter portion of said first chamber, at least one second substantially vertical conduit extending from above the bottom of said second chamber into the upper portion of said first chamber external to said annular section, at least one third conduit extending downwardly from the bottom of said annular section into the bottom portion of said second chamber, means for introducing gasiform material to the bottom of said first and second conduits, means for introducing gaseous material to the lower portion of said first and second chambers and means for removing gasiform material from the upper portion of each of said chambers.

References Cited in the file of this patent

UNITED STATES PATENTS

| | | |
|---|---|---|
| 2,506,293 | Copeland | May 2, 1950 |
| 2,785,110 | Leffer | Mar. 12, 1957 |
| 2,891,001 | Wickham et al. | June 16, 1959 |
| 2,962,362 | Moorman | Nov. 29, 1960 |
| 2,994,659 | Slyngstad et al. | Aug. 1, 1961 |